March 24, 1970  R. R. RHOADS  3,502,753
EXTRUDING FOAMED PLASTICS
Filed May 13, 1966

Inventor.
ROGER R. RHOADS
By
ATT'YS.

United States Patent Office 3,502,753
Patented Mar. 24, 1970

3,502,753
EXTRUDING FOAMED PLASTICS
Roger R. Rhoads, Toledo, Ohio, assignor to Owens-Illinois, Inc., a corporation of Delaware
Filed May 13, 1966, Ser. No. 550,053
Int. Cl. B29d 23/04; B29h 7/20; B29b 3/04
U.S. Cl. 264—51                                 3 Claims

ABSTRACT OF THE DISCLOSURE

There is disclosed a process for preparing a foamed plastic article by flowing a foamable plastic material under pressure through an essentially infinitely short orifice at the exit end of an extrusion die.

---

This invention relates generally to blow molding of plastics, and more particularly to a method of making parisons from foamed plastic.

Hollow articles can be made from foamed plastic materials by blow molding. Such articles may weigh substantially less than equivalent non-foamed plastic articles. This saving of material could result in lower manufacturing costs provided that the foamed plastic articles satisfy all specifications for commercially salable items.

It has been known that for a foam article to retain the physical properties of the base plastic, the average cell size of the foam material should be as small as possible. It has also been known that the walls of a foam plastic parison should be relatively thick in order to allow a relatively large container or other article to be formed from the parison without blowout. Parisons with thicker walls may be extruded from a die having a correspondingly large gap. However, increasing the die gap to produce thicker sections results in larger cell size, thus causing the physical properties of the foam to differ from those of the base plastic material. Specifically, such foam plastic is weaker than the base material.

By the method of the present invention, it is possible to produce thick-walled parisons and yet obtain a fine cell size in the material. The method can be carried out at reasonably low pressure (1600–1900 p.s.i.), whereas in the past higher pressure (3000–5000 p.s.i.) have been necessary to produce fine cell size.

The method of the present invention is carried out by flowing foamable plastic material under pressure along a flow path through a die which has a constricted orifice at its exit end. The orifice subjects the flowing material to high shear and causes the material to foam into small cells as it flows out of the die into a parison. By making the orifice much smaller in cross-sectional area than the flow path leading to the orifice, a very fine cell size is obtained. The orifice is made essentially infinitely short so there is little pressure drop across it. It has been found that when very high shear is utilized in this manner, the extrusion can be carried out at pressures below 2,000 p.s.i. whereas higher pressures have previously been considered to be necessary. The wall thickness of the parison may be adjusted by changing the size of the die gap ahead of the orifice.

It is therefore, an object of the present invention to form parisons having relatively thick walls with foamed material having very fine cell size.

Another object of the invention is to provide a method of forming foam plastic tubes by subjecting the material to high shear stresses just before it emerges from an extrusion die.

A further object of the invention is to provide a method of making foamed plastic parisons wherein foamable material is passed through an extrusion die and particularly through a short, reduced-area orifice at the exit end of the die which decreases the viscosity of the material sufficiently to make it foam as it leaves the die.

In its broadest application, this invention relates to a method of forming foamed plastic articles having thick cross sectional portions and yet having a very fine cell size, regardless of whether such articles are in their final form or are in the form of parisons which are subsequently reformed, as by blow molding and also regardless of whether they have a tubular or solid cross sectional configuration.

Other objects of this invention will appear in the following description and appended claims, reference being had to the accompanying drawings forming a part of this specification wherein like reference characters designate corresponding parts in the several views.

Figure 1:
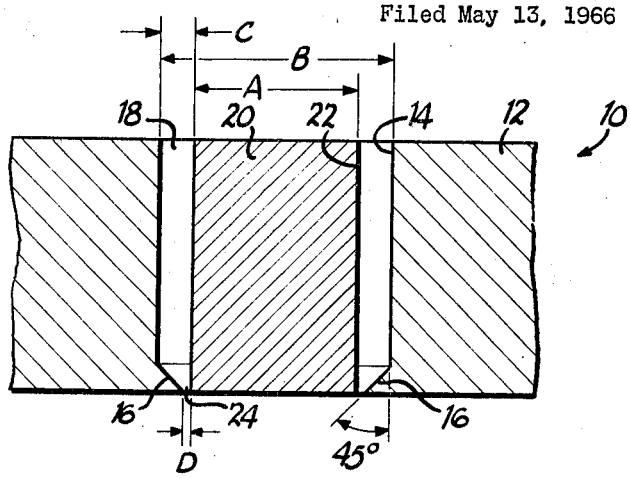
FIGURE 1 is a fragmentary vertical sectional view of a die which is utilized in carrying out the method of the invention.
Figure 2:
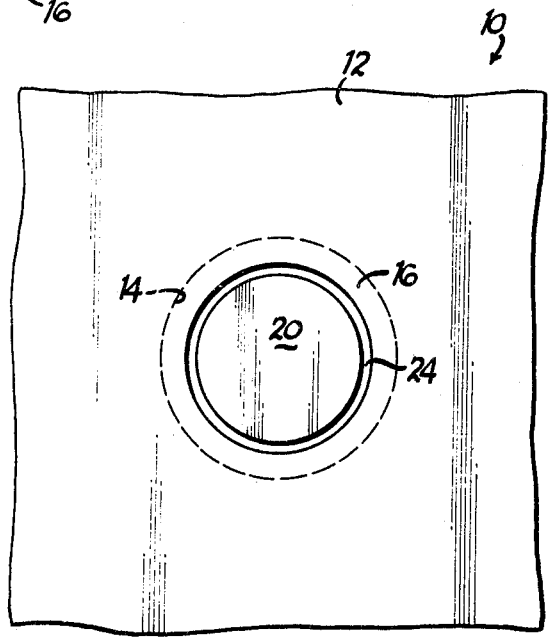
FIGURE 2 is a fragmentary bottom plan view of the die of FIGURE 1.
Figure 3:
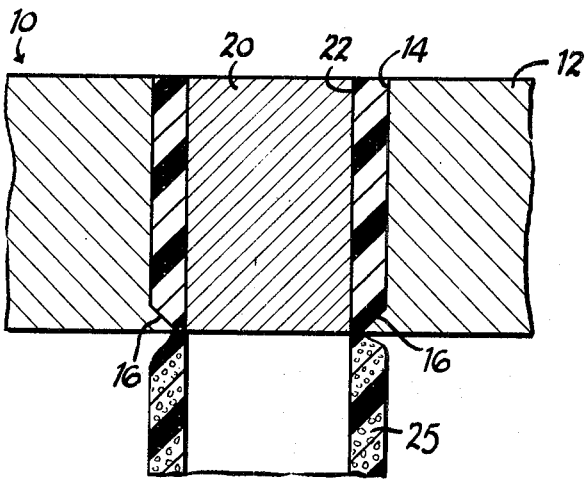
FIGURE 3 is a view similar to FIGURE 1 but showing a parison below the die.

Before explaining the present invention in detail, it is to be understood that the invention is not limited in its application to the details of construction illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

The die 10 includes an outer annular section 12 having a bore 14 extending through it which terminates at the bottom side of the die in a projection 16 which extends radially inwardly of the bore. Only the die 10 has been shown, but reference may be made to application Ser. No. 517,711 of Dec. 30, 1965 now Patent No. 3,389,197 for details of construction of suitable extruder apparatus. Both the bore 14 and the projection 16 are circular, and together they define one wall of an annular passage 18 which extends through the die 10. Within the bore 14 there is a core or mandrel 20 which has a cylindrical outer surface 22 cooperating with bore surface 14 to define the annular passage 18.

There is an orifice gap 24 between the tip of projection 16 and surface 22 of core member 20 It may be seen that the orifice gap is very small, preferably not greater than one-half of the die gap through the rest of the passageway 18. The tip of the projection 16 is a knife edge, so the orifice is essentially infinitely short. Because the orifice gap is of such short length, the pressure drop across the system is not increased appreciably.

The method of the invention is carried out by passing foamable plastic material under pressure, as from a conventional plasticizer-extruder (not shown), through the passage 18 extending through die 10 and through the short, reduced-area orifice 24 at the exit end of the die. The orifice exerts high shear on the material causing it to foam into small cells as it leaves the die, and the swelling of the material after it leaves the die provides a parison 25 which is thick enough to be blow molded into a container with a higher blow-up ratio than if the orifice gap were longer.

It has been found that the parison 25 which is extruded from orifice gap 24 has a wall thickness which is determined by the gap of passageway 18 ahead of the restricted gap at orifice 24. The wall thickness of the parison tends to be about the same as the width of passageway 18. The high shear rate due to the infinitely short narrow orifice gap 24 results in an unusually fine cell size in the plastic parison 25 which is extruded from the die.

Certain key dimensions are labeled A, B, C, and D, in FIGURE 1. Illustrative values for these dimensions are set forth in Table I which follows, along with examples of container weight, cell size and system pressure for the corresponding dimensions.

TABLE I

| Examples | 1 | 2 | 3 |
|---|---|---|---|
| A (in.) | .500 | .500 | .500 |
| B (in.) | .640 | .640 | .625 |
| C (in.) | .070 | .070 | .062 |
| D (in.) | .070 | .025 | .025 |
| Parison weight (gm.) | 28 | 22 | 16.5 |
| Cell size (average) (mm.) | 0.25 | 0.08 | 0.08 |
| Pressure (p.s.i.) | 2,000–2,500 | 1,600–1,900 | 1,600–1,900 |

The material used in all of the examples set forth in Table I was a high density polyethylene sold under the trademark Marlex 6035 which was blended with commercially available foaming agents. However, any thermoplastic material containing an appropriate foaming agent can be used. A suitable foaming agent is azodicarbonamide, sold under the trademark "Kempore." A large number of suitable materials are given in the literature, and many such materials are listed in United States Patent No. 3,186,207.

Referring to Table I, in Example 1 dimensions C and D were the same; that is, the die had a straight-through passage with a die gap of 0.70 inch. The outside diameter of core 20 was .500 inch and the inside diameter of annular surface 14 was .640 inch. With these dimensions, the parison extruded under a pressure of 2000–2500 p.s.i. weighed 28 gm. and had a cell size of .25 mm. This example, then, serves as a control for comparison with Examples 2 and 3 wherein the material was extruded through a much smaller orifice at the exit end of passageway 18.

In Example 2, the orifice gap was narrowed to .025 inch, but the other dimensions of the die remained the same. This resulted in a substantially smaller cell size, specifically .08 mm. as compared to .25 mm. for Example 1. The material was extruded under a reduced pressure of 1600–1900 p.s.i. and yet the fine cell size just referred to was still obtained. The parison weight was 22 gm. and it had sufficiently thick walls to be blown into a container with a high blow-up ratio.

In Example 3 dimensions B and C were changed, and this resulted in a parison of lower weight although its cell size remained the same; i.e., .08 mm. The initial die gap was reduced to .062 inch and the inside diameter of surface 14 was reduced to .625 inch. This resulted in a parison weight of 16.5 gm. and a cell size of 0.8 mm. The extrusion was still carried out under a relatively low pressure of 1600–1900 p.s.i. This example shows that the weight and wall thickness of the foam parison is dependent primarily on the die gap of passageway 18 ahead of orifice 24. In Example 3 the die gap was smaller than in Example 2, and a lighter, thinner parison resulted.

It is evident from the foregoing description that the method of the present invention makes it possible to form thick parisons having a small cell size. This is accomplished with an extremely simple die and also with relatively low pressure which is a definite safety advantage. Articles with a high blow-up ratio can be formed from the parisons with a desirable saving of material as compared to non-foamed articles.

Additionally, it is possible to form other foamed articles which are not subsequently blow molded or otherwise reformed.

I claim:

1. A process for extruding foamable thermoplastic material comprising the steps of flowing foamable plastic material under pressure through an essentially cylindrical annulus of an extrusion die at a substantially uniform pressure and flow rate, subjecting the flowing material to high shear stress only at the extreme exit end of the annulus by compelling the material to flow through an essentially infinitely short orifice at said extreme exit end, said orifice comprising a knife edge taper formed by a projection extending radially into the annulus, so that the orifice is of substantially reduced cross-sectional area relative to that of the remainder of the annulus and extruding the material from said orifice into a foamed plastic article.

2. In a process as defined in claim 1 wherein said annulus is defined by the essentially concentric inner and outer die element, one of said elements terminating in said knife edge and said annulus being cylindrical for an appreciable distance inwardly of said knife edge so that material flow through said annulus is subjected to sudden and severe high shear stress at the time of issuance of said orifice.

3. In a process as defined in claim 2, the further improvement wherein said knife edge is formed on said outer element to project radially inwardly therefrom.

References Cited

UNITED STATES PATENTS

| 2,835,927 | 5/1958 | Henning | 264—47 |
| 3,013,309 | 12/1961 | Maier et al. | |
| 3,225,127 | 12/1965 | Scott | 264—54 |
| 3,327,031 | 6/1967 | Boyer et al. | 264—177 XR |
| 3,327,038 | 6/1967 | Fox. | |
| 3,385,917 | 5/1968 | Breukink et al. | 264—51 |

FOREIGN PATENTS

| 810,638 | 3/1937 | France. |

OTHER REFERENCES

Dilley, E. R.: "The Use of Chemical Blowing Agents in Direct Extrusion Expansion," in Transactions of the Journal of Plastics Institute, February 1966, pp. 19–21.

PHILIP E. ANDERSON, Primary Examiner

U.S. Cl. X.R.

18—14; 264—54, 98, 177, 209